UNITED STATES PATENT OFFICE.

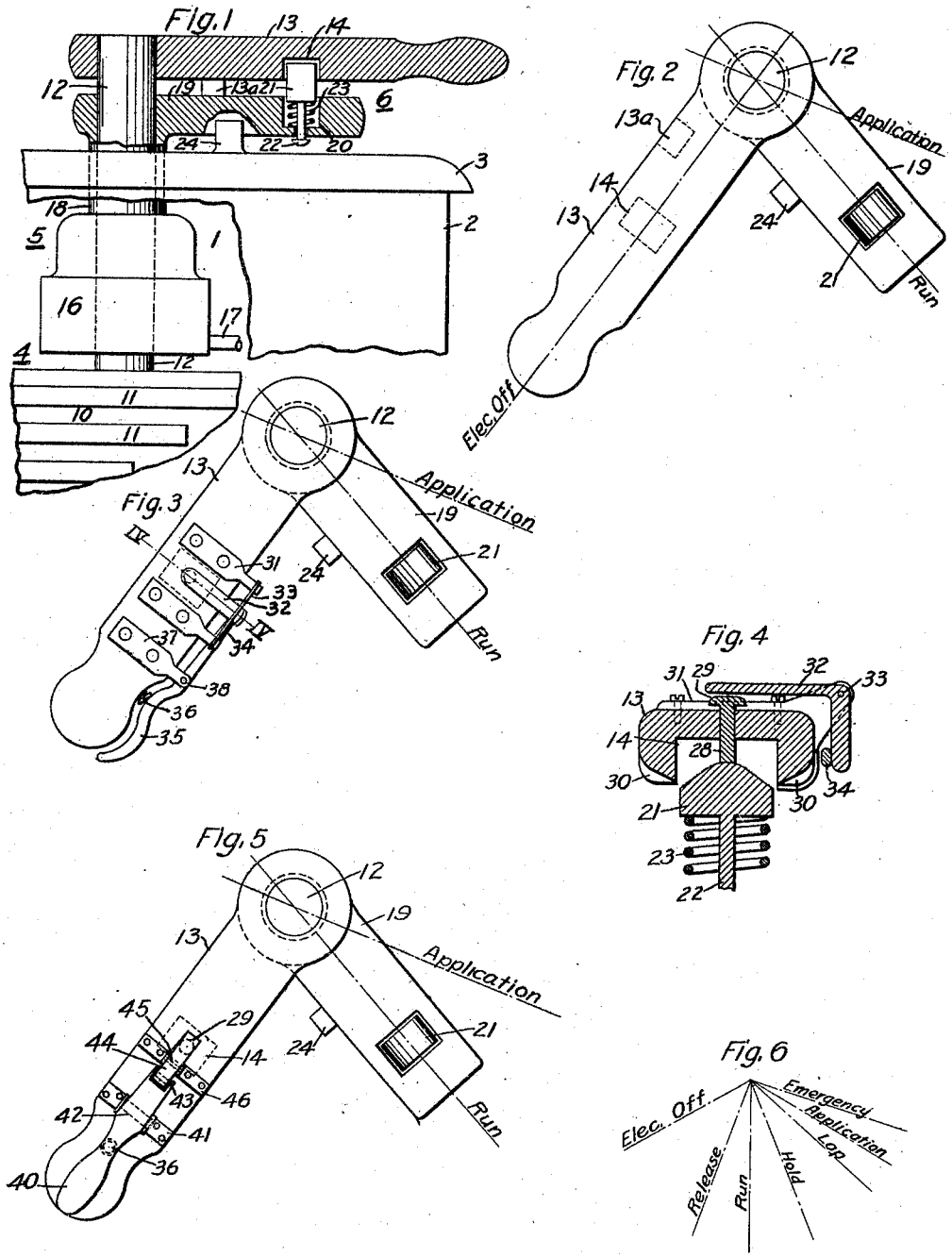

ROBERT D. McMANIGAL, JR., OF PITTSBURGH, PENNSYLVANIA, ASSIGNOR TO WESTINGHOUSE ELECTRIC & MANUFACTURING COMPANY, A CORPORATION OF PENNSYLVANIA.

CONTROL APPARATUS.

1,303,349.         Specification of Letters Patent.         Patented May 13, 1919.

Application filed July 6, 1917. Serial No. 178,966.

*To all whom it may concern:*

Be it known that I, ROBERT D. MCMANIGAL, Jr., a citizen of the United States, and a resident of Pittsburgh, in the county of Allegheny and State of Pennsylvania, have invented a new and useful Improvement in Control Apparatus, of which the following is a specification.

My invention relates to control apparatus and especially to operating means for drum controllers and the like.

The object of my invention is to provide a relatively simple combined apparatus of the drum type whereby electrical circuits for effecting regenerative braking of a vehicle or train may be governed during a certain portion of the travel of an operating handle, and a second braking system, such as the familiar air-brake, may be rendered operative when the handle reaches a predetermined position corresponding to the end of the regenerative period, without requiring any special action or attention on the part of the train operator.

My invention may best be understood by reference to the accompanying drawing, wherein Figure 1 is a fragmentary view, partially in elevation and partially in section, of a controlling device constructed in accordance with the present invention; Fig. 2 is a plan view of the operating means for the apparatus that is shown in Fig. 1; Fig. 3 is a view, corresponding to Fig. 2, of a modified form of my invention; Fig. 4 is a sectional view taken on the line IV—IV of Fig. 3; Fig. 5 is a view, corresponding to Fig. 2, of a further modification of the invention; and Fig. 6 is a chart representing the various positions of the familiar engineer's valve for air-braking systems.

Referring to Fig. 1 and Fig. 2 of the drawing, the apparatus shown comprises suitable incasing means including, for example, the familiar base or back-plate 1, the curved front cover member 2 and top cover-member or plate 3; a contact-carrying drum member 4 for governing the desired electrical circuits; an engineer's valve 5 for controlling an air-braking system, the two controlling members 4 and 5 being preferably located within the incasing means; and a composite actuating means 6 for selectively effecting movement of the two controlling members 4 and 5.

The drum member 4 may comprise the familiar cylinder or body member 10 upon which is mounted a plurality of contact segments 11 of appropriate contour for governing any desired circuits, the drum being mounted upon the customary centrally-located shaft 12 which extends upwardly through the top plate 3 and to which the actuating handle proper 13 is operatively attached. The handle 13 is provided with a recess or depression 14 in its under surface to effect an automatic function that is subsequently explained.

The specific construction of the engineer's valve 5 is immaterial to my present invention and may be of any well-known type, comprising, in general, a suitably chambered incasing member or shell 16 with which is associated a plurality of appropriate inlet and outlet pipes or passages 17 for conveying fluid pressure from any suitable source (not shown).

The engineer's valve 5 is rigidly mounted upon a sleeve member 18 that loosely incloses the drum shaft 12, and a projecting arm 19, for actuating purposes, is integrally or otherwise related to the sleeve member 18 and is located outside of the controller-incasing means.

The composite actuating means 6 comprises the actuating handle proper 13 and the projecting arm 19, both of which are capable of rotative movement around the same axis, by reason of the concentric relation of the shaft 12 and the sleeve 18. The arm 19 has a recess or depression 20 in the upper side thereof that is located in substantially vertical alinement with the recess 14 of the handle member 13 when the handle 13 and the arm 19 occupy the similar positions that are illustrated in Fig. 1. A latch or locking member 21 is positioned within the recess 20 by means of a guiding pin 22 and is normally biased to the illustrated upper position through the action of a coil spring 23.

A lug or stop member 24, upon the upper surface of the top plate-member 3, is provided for the purpose of normally positioning the projecting arm 19 and for preventing movement thereof beyond the desired limit.

Inasmuch as the particular electrical or mechanical braking systems that are governed by my control apparatus are immaterial to the present invention, I have not deemed it necessary to illustrate or describe any such systems in greater detail. As an example of a combined braking system to which my invention is readily applicable, reference may be had to a co-pending application of Rudolf E. Hellmund, Serial No. 142,644, filed January 16, 1917, and assigned to the Westinghouse Electric & Manufacturing Company.

Assuming the apparatus to occupy the electrically inoperative position that is indicated by the separated condition of the handle member 13 and the projecting arm 19 (Fig. 2), the operation of my apparatus may be set forth as follows: By manipulating the handle member 13 through any desired number of positions to the right of the position marked "Off," which is the normal location of the projecting arm 19, the drum member 4 may be utilized to control the electrical braking system in the desired manner. As is customary in manually-controlled electrical braking systems, the handle member 13 will be gradually moved toward the final electrical position, marked "Run," as the speed of the momentum-driven vehicle decreases and, at a predetermined relatively low speed, when regenerative braking is no longer effective or feasible, the handle member 13 will be actuated to the "Run" position in vertical alinement with the projecting arm 19 of the air-braking apparatus.

Under such conditions, the latch 21 is first depressed by the handle member 13 and is then forced into the recess 14 thereof by the spring 23, as illustrated in Fig. 1. Consequently, further movement of the actuating handle 13 to the position marked "Application" (Fig. 2), without any special action or attention on the part of the train operator, carries the projecting arm 19 along with the handle 13. In this way, the engineer's valve 5 is manipulated to its "Application" position to afford the usual mechanical braking effort in order to bring the vehicle or train to a standstill.

To relieve the duty of the latch 21, under such conditions, a wedge-shaped projection 13ª may be located on the under side of the handle 13 to frictionally engage the arm 19 during counter-clockwise movement.

Furthermore, the actuation of the control drum 4 beyond the "Off" position is preferably utilized to interrupt the electrical circuits and thus permit the subsequent retardation of the vehicle or train to be accomplished entirely by the air-brake.

When the handle member 13 is returned, in a clockwise direction, toward the "Elec. off" position, the projecting arm 19 is carried as far as the "Run" position, where it will remain by reason of engaging the stop member 24 on the top cover-member 3 of the controller. Continued movement of the actuating handle 13 is substantially unimpeded, since the handle merely slides over the latch 21, as will be understood.

Referring now to Fig. 3 and Fig. 4, the structure shown comprises, in addition to that already described, a pin or stem 28 that projects through the handle member 13 into the recess 14 and normally rests upon the latching member 21. The pin 28 is provided with a suitable enlarged head 29 for the double purpose of preventing the loss of the pin and also for providing a suitable contact surface that may be engaged by a right-angled or bell-crank lever member 32, at the will of the train operator, as hereinafter set forth in detail.

The lever member 32 is mounted, at the junction of its horizontal and vertical arms, upon a pin 33 which extends substantially parallel to the actuating handle 13 and is mounted in a plurality of spaced bracket members 31 that may be secured by the illustrated screws, or otherwise, to the actuating handle.

The inner end 34 of a thumb-lever 35 normally occupies a position adjacent to the vertical arm of the bell-crank lever 32. The outer end of the thumb-lever 35 is located near the corresponding end of the actuating handle 13, in accordance with a familiar practice, and is biased to the illustrated position by means of a smalll coil spring 36 which is located between the thumb-lever and the handle. A suitable bracket member 37 is secured to the upper surface of the handle 13 for the purpose of pivotally supporting the thumb lever 35 at the intermediate point 38 thereof.

To facilitate the smooth interlocking action of the latching member 21 and the handle member 13, the latch may be provided with an upper surface having the sharply-sloping contour illustrated in Fig. 4, while the lower corners of the handle member 13 near the recess 14 may be cut away, as illustrated at 30 (Fig. 4). In this way, the engagement of the coöperating parts is smoothly effected, while the latching member, when once within the recess 14, is tightly held there.

To unlock the projecting arm 19 from the actuating handle 13 when the control apparatus is returned from "Application" position to "Run" position, the train operator may proceed as follows: The thumb-lever 35 is pressed toward the handle 13 against the action of the spring 36, whereby the inner end-portion 34 of the thumb-lever is moved outwardly to engage the vertical arm of the bell-crank lever 32 and cause a downward movement of the horizontal arm thereof to engage the head 29 of the pin 28, whereby the latch 21 is depressed sufficiently to permit the handle 13 to be readily disengaged therefrom when the stop member 24 is reached.

Referring to Fig. 5, in addition to the structure shown in Fig. 2, a thumb-lever appliance corresponding to that illustrated in Fig. 3, but located on the top side of the handle 13 is shown. The appliance embodies a suitable thumb-lever 40 which is pivotally mounted upon a suitable bracket member 41 at an intermediate point 42. The inner end of the lever 40 is pivotally associated, at 43, with a bar or rod 44 that has a further intermediate pivotal connection 45 with a bracket member 46, which is suitably secured to the handle 13. The free end of the bar 44 is located above the head 29 of the pin 28.

To effect preliminary separation of the arm 19 from the handle 13, the thumb lever 40 is depressed to elevate the adjacent end and depress the remote end of the bar 44, whereby the pin 28 is forced downwardly to permit the handle 13 to be disengaged from the latch 21 when the stationary stop member 24 is struck.

In any of the previously described cases, the complete separation of the arm 19 and the handle 13 does not occur until the illustrated "Run" position is attained, thereby insuring the release of the air-brakes before any further operation of the electrical system.

In some instances, for example, when an air-brake of the fully automatic type is installed upon a locomotive, it will be necessary to provide means for completely disengaging the latching member at any desired time, since, in releasing the air-brakes from the trailing vehicles or train, the arm 19 for operating the air-brakes must be returned beyond the ordinary "Run" position to the "Release" position, held there until all train-brakes are off and then moved back to the "Run" position. The relative arrangement of such positions is indicated in Fig. 6, wherein is also shown the remaining positions which are available in the case of the familiar fully automatic air-brake.

After the arm 19 has been returned to the "Run" position, it should be unlatched, and the handle member proper 13 may me returned to its inoperative position marked "Elec. off", standing for the normal or open-circuit electrical position.

To permit the operation just recited, the stop member 24 is omitted and the pin 28 is provided with a base or disk of substantially the same size as the recess 14, whereby a pressure of the thumb-lever 35 or the thumb-lever 40 will push the latch 21 completely beyond the recess and permit the desired immediate disengagement of parts.

As will be appreciated by those skilled in the art, the arrangement just outlined will lend itself particularly well to operation in conjunction with electro-pneumatic brakes.

I do not wish to be restricted to the specific structural details or arrangement of parts herein set forth, as various modifications thereof may be effected without departing from the spirit and scope of my invention. I desire, therefore, that only such limitations shall be imposed as are indicated in the appended claims.

I claim as my invention:

1. In control apparatus, the combination with a plurality of movable members for respectively controlling independent braking systems, of means for manipulating one of said members alone for a portion of its travel and concurrently with a second member during another portion of the travel.

2. In control apparatus, the combination with a plurality of concentrically-related rotatable members for respectively controlling independent braking systems, of common means for manipulating in the same direction one and both of said members during different portions of the travel of said common means.

3. In control apparatus, the combination with a rotatable drum member and an actuating handle therefor, of a second rotatable member, and means for effecting movement of said second member by the actuation of said handle, during a portion of the travel thereof, in the same direction as the drum member.

4. In control apparatus, the combination with a rotatable drum member and an actuating handle therefor, of a second rotatable member concentrically related to said drum member, and means for effecting movement of said second member by the actuation of said handle during a portion of the travel thereof.

5. In control apparatus, the combination with a rotatable drum member and an actuating handle therefor, of a second rotatable member having a projecting arm, and latching means positioned on said arm for resiliently engaging said handle under predetermined conditions.

6. In control apparatus, the combination with a rotatable drum member and an actuating handle therefor, of a second rotatable member having a projecting arm, a stop member for normally positioning said arm, and latching means located on the arm for engaging said handle in a predetermined position thereof.

7. In a controller, the combination with incasing means, of a rotatable drum member and an actuating handle therefor respectively located inside and outside of said incasing means, a second rotatable member disposed within said incasing means and having a projecting arm outside thereof, and latching means positioned on said arm for engaging said handle under predetermined conditions.

8. In a controller, the combination with incasing means, of a rotatable drum member and an actuating handle therefor respectively located inside and outside of said incasing means, a second rotatable member disposed within said incasing means and having a projecting arm outside thereof, a stop member on said incasing means for normally positioning said arm, and latching means located on the arm for engaging said handle in a predetermined position thereof.

9. In a controller, the combination with incasing means, of a rotatable drum member and an actuating handle therefor respectively located inside and outside of said incasing means, a second rotatable member concentrically related to said drum member and having a projecting arm outside of said incasing means, and latching means positioned on said arm for resiliently engaging said handle under predetermined conditions.

10. In a controller, the combination with incasing means, of a rotatable contact-carrying drum having a central shaft and an actuating handle therefor respectively located inside and outside of said incasing means, an air-valve disposed within said incasing means and having a sleeve inclosing said shaft, a projecting arm secured to said sleeve externally to said incasing means, a stop member on the incasing means for normally positioning said arm, and latching means located on said arm for engaging said handle in a predetermined position thereof.

11. In control apparatus, the combination with a rotatable drum member and an actuating handle therefor, of a second rotatable member having a projecting arm, latching means positioned on said arm for resiliently engaging said handle under predetermined conditions, and means mounted upon said handle for actuating said latching means.

12. In control apparatus, the combination with a rotatable drum member and an actuating handle therefor, of a second rotatable member having a projecting arm, latching means positioned on said arm for resiliently engaging said handle in a predetermined position thereof, and a lever member mounted upon said handle for manually unlocking said latching means.

In testimony whereof, I have hereunto subscribed my name this 29th day of June 1917.

ROBERT D. McMANIGAL, Jr.

Copies of this patent may be obtained for five cents each, by addressing the "Commissioner of Patents, Washington, D. C."